(12) United States Patent
Krzanowski

(10) Patent No.: US 8,553,583 B2
(45) Date of Patent: Oct. 8, 2013

(54) LEAKY ETHERNET TREES

(75) Inventor: Roman Krzanowski, White Plains, NY (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 323 days.

(21) Appl. No.: 13/020,882

(22) Filed: Feb. 4, 2011

(65) Prior Publication Data
US 2012/0201249 A1    Aug. 9, 2012

(51) Int. Cl.
*H04L 12/28*    (2006.01)
*G06F 15/16*    (2006.01)

(52) U.S. Cl.
USPC ............................. 370/254; 370/389; 709/252

(58) Field of Classification Search
None
See application file for complete search history.

(56) References Cited

U.S. PATENT DOCUMENTS

| | | | |
|---|---|---|---|
| 6,421,316 B1 * | 7/2002 | Masuo | 370/216 |
| 7,072,952 B2 * | 7/2006 | Takehiro et al. | 709/221 |
| 7,185,077 B1 * | 2/2007 | O'Toole et al. | 709/223 |
| 7,965,709 B2 * | 6/2011 | Du | 370/389 |
| 8,270,290 B2 * | 9/2012 | Casey et al. | 370/218 |
| 8,325,598 B2 * | 12/2012 | Krzanowski | 370/228 |
| 2004/0255050 A1 * | 12/2004 | Takehiro et al. | 709/252 |
| 2008/0112333 A1 * | 5/2008 | Busch et al. | 370/252 |
| 2009/0034413 A1 * | 2/2009 | Sajassi et al. | 370/228 |
| 2009/0271467 A1 * | 10/2009 | Boers et al. | 709/201 |
| 2010/0074098 A1 * | 3/2010 | Zeng et al. | 370/217 |
| 2011/0145394 A1 * | 6/2011 | Krzanowski et al. | 709/224 |
| 2012/0147893 A1 * | 6/2012 | Shabtay et al. | 370/395.53 |
| 2012/0155298 A1 * | 6/2012 | Yang et al. | 370/252 |
| 2012/0300784 A1 * | 11/2012 | Jiang | 370/395.53 |

* cited by examiner

*Primary Examiner* — Hassan Phillips
*Assistant Examiner* — Hicham Foud

(57) ABSTRACT

A network device may receive an Ethernet frame from a first leaf user-to-network (UNI) interface in a tree. The tree includes the first leaf UNI, a second leaf UNI, and a root UNI. In addition, the network device may look up, in a table, source and destination media access control (MAC) addresses in the Ethernet frame and a field value in a virtual local area network (VLAN) tag in the Ethernet frame. The destination MAC address is associated with the second leaf UNI. In addition, the network device may identify, based on the lookup, an output port via which the Ethernet frame is to be sent from the network device. Furthermore, the network device may send, through the output port, the Ethernet frame toward the second leaf UNI in the tree via a network path that includes the first leaf UNI and the second leaf UNI. The network path does not include the root UNI of the tree.

20 Claims, 12 Drawing Sheets

608 ↓

| | SOURCE MAC ADDRESS 1002 | DESTINATION MAC ADDRESS 1004 | PCP BITS 1006 | EGRESS PORT 1008 |
|---|---|---|---|---|
| ROW 1 | MAC-L1 | MAC-R1 | ANY | R1 |
| ROW 2 | MAC-L1 | MAC-L2 | T | L2 |
| ROW 3 | MAC-L1 | MAC-L3 | T | L3 |
| ROW 4 | MAC-L2 | MAC-L1 | T | L1 |
| ROW 5 | MAC-L1 | MAC-L2 | T | L2 |
| ROW 6 | MAC-L1 | MAC-L3 | ~T | DROP |
| ROW 7 | MAC-L2 | MAC-L1 | ~T | DROP |
| ROW 8 | MAC-R1 | MAC-L1 | ANY | L1 |
| ROW 9 | MAC-R1 | MAC-L2 | ANY | L2 |
| ROW 10 | MAC-R1 | MAC-L3 | ANY | L3 |

FIG. 10

LEAKY ETHERNET TREES

BACKGROUND INFORMATION

In recent years, carrier-class Ethernet has emerged as a significant technology with respect to transport of traffic over Metro Area Networks (MANs). For example, in the United States, the demand for Ethernet services is expected to increase at a compound annual growth rate (CAGR) of over 20%. The demand is projected to exceed $5 billion by 2012. Such growth and increasing demand are partly driven by the need for higher bandwidth for site-to-site and data center connectivity, scalability, performance, and security.

BRIEF DESCRIPTION OF THE DRAWINGS

FIG. 10 illustrates an exemplary implementation of the leaky tree switching table of FIG. 6.

DETAILED DESCRIPTION OF PREFERRED EMBODIMENTS

The following detailed description refers to the accompanying drawings. The same reference numbers in different drawings may identify the same or similar elements. As used herein, in some contexts, the term "tree" may refer to a logical network configuration in which one endpoint of network traffic, called a root, connects to multiple other endpoints, called "leaves." As used herein, the term "non-leaky tree" may refer to a tree whose leaf can send data to another leaf only through a root of the tree. As used herein, the term "leaky tree" may refer to a tree whose leaf can send data directly to another leaf, without going through a root. Depending on the context, the term "tree" may refer to a non-leaky tree or a leaky tree. Furthermore, depending on the context, the terms "tree," "leaky tree," or "non-leaky tree" may refer to a network service (e.g., Ethernet service) that is associated with the network configuration.

Figure 1A:
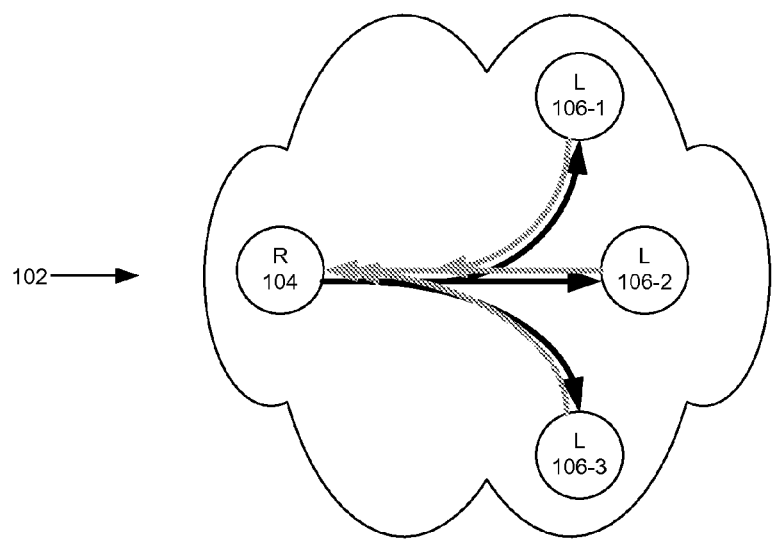
FIGS. 1A and 1B illustrate concepts described herein.
Figure 1B:
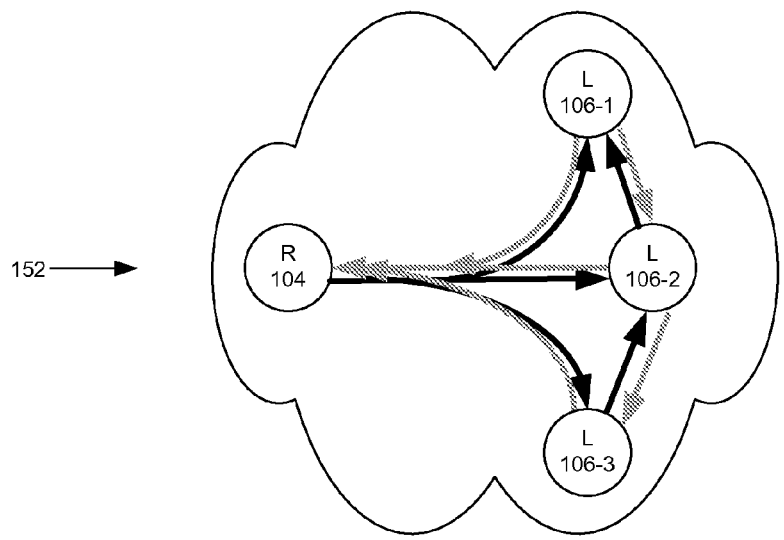

As described below, in a leaky tree, one or more devices may allow data to be sent or forwarded directly from a leaf to another leaf. FIGS. 1A and 1B illustrate the concept. FIG. 1A shows a tree 104. As shown in FIG. 1A, tree 102 (i.e., non-leaky tree) may include a root 104 and leaves 106-1 through 106-3 (collectively referred to as leaves 106 and individually as leaf 106-x). As shown by different arrows, in tree 102, network traffic may travel from root 104 to leaves 106 and from leaves 106 to root 104. However, the traffic may not flow from leaf 106-x directly to another leaf 106-y. For example, for data to travel from leaf 106-1 to leaf 106-2, the data must first travel from leaf 106-1 to root 104 and then from root 104 to leaf 106-2.

FIG. 1B shows a leaky tree 152. As shown in FIG. 1B, leaky tree 152 may include the same network elements as tree 102. However, in contrast to leaves 106 in tree 102, in leaky tree 152, leaves 106 may directly send data to other leaves 106. That is, a leaky tree 152 is a tree whose leaves "leak" traffic to other leaves.

Leaky tree 152 may be more efficient than tree 102 in conveying data between leaves 106 in certain situations (e.g., in situations where root 104 only relays data from one leaf 106-x to another leaf 106-y without processing the data). In addition, leaky tree 152 uses a single virtual local area network identifier for traffic flows between a root and leaves, as well as for flows between the leaves. Accordingly, a subscriber (e.g., a user at a network element (e.g., a leaf or root)) may not need to purchase, for example, additional Ethernet virtual circuit service, described below, to support leaf-to-leaf traffic.

Tree 102 and leaky tree 152 in FIGS. 1A and 1B are exemplary. In an actual implementation, tree 102 or leaky tree 150 may include additional or fewer leaves than those illustrated in FIGS. 1A and 1B. In addition, although not shown for simplicity, tree 102 or leaky tree 152 may include additional network elements between root 104 and a leaf 106-x, and between leaves 106.

Figure 2:
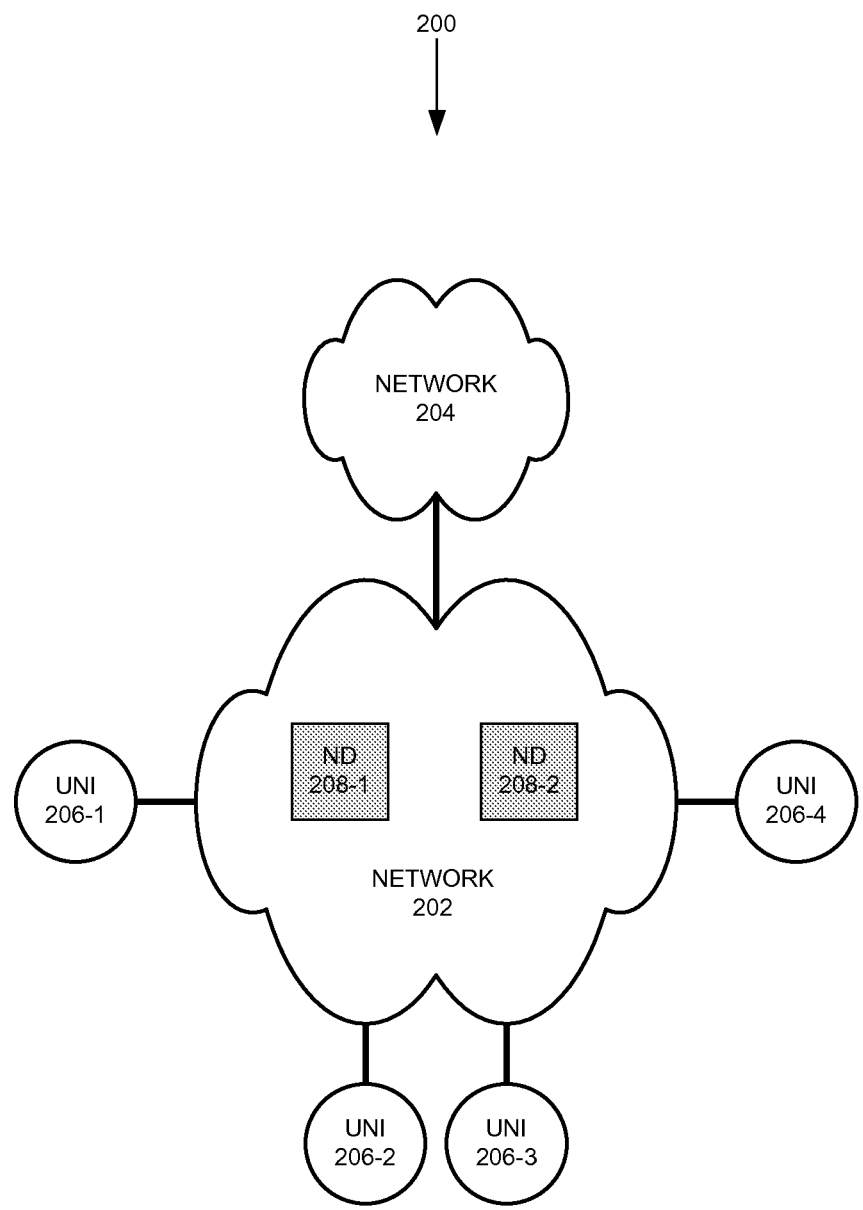
FIG. 2 shows an exemplary network in which one or more trees or leaky trees of FIGS. 1A and 1B may be implemented.

FIG. 2 shows an exemplary network 200 in which one or more trees or leaky trees may be implemented. As shown, network 200 may include service provider network 202, network 204, user to network interfaces (UNIs) 206-1 through 206-4 (collectively herein referred to as UNIs 206 and individually as UNI 206), and network devices 208-1 and 208-2 (collectively network devices 208 and individually network device 208). Depending on the implementation, network 200 may include may include additional, fewer, or different networks and/or network elements than those illustrated in FIG. 2. For example, in one implementation, network 200 may include one or more metro Ethernet networks (MENs), network-to-network interfaces (NNIs) between the MENs, Synchronous Optical Network (SONET) network rings that are interconnected by long-haul optical lines, additional network elements (e.g., routers, switches, network devices, etc.), servers, client devices, wireless devices, etc.

Service provider network 202 may include optical fibers/non-optical lines and central office hubs that are interconnected by the fibers/lines. The optical fibers and the lines may form the backbone of service provider network 202. The central office hubs may provide telecommunication services to subscribers, such as telephone service, access to the Internet, cable television programs, etc., via line terminals. Each central office hub may house telecommunication equipment, including switches (e.g., Ethernet switches), optical line terminals, etc.

Network 204 may include a wired or wireless network via which devices communicate (e.g., a fiber-optic network, a local area network (LAN), a wide area network (WAN), a wireless LAN, a metropolitan area network (MAN), a cellular network, a public switched telephone network (PSTN), an intranet, the Internet, a satellite-based network, any other network, or a combination of networks).

UNI 206 may include a physical interface that is a demarcation point between a subscriber and a service provider. UNI 206 is typically provided by a service provider/carrier and may be capable of supporting one or more bandwidths, such as 10 Mbps, 100 Mbps, 1 Gbps, 10 Gbps, etc. In some implementations, UNI 206 may operate as a leaf or a root, for example, in a tree or a leaky tree network configuration.

In FIG. 2, one UNI (e.g., UNI 206-1) may form an Ethernet virtual circuit (EVC) over network 202 with another UNI (e.g., UNI 206-2). The term Ethernet virtual circuit (EVC), as used herein, may not only refer to a logical network configuration, but also to a service provided by participating network elements (e.g., UNIs). Hence, a UNI that is part of an EVC may also participate in the EVC service.

Multiple EVCs may be bundled within a UNI or multiplexed on the same UNI. Each EVC may carry a single Class of Service (CoS) channel, or alternatively, carry multiple channels of different CoSs (e.g., Ethernet Virtual Private Line (EVPL)-Real Time (RT), EVPL-basic (B), EVPL-Priority Data (PD), etc.). As described below with reference to FIGS. 4A, 4B, and 5A, and 5B, UNIs may form different types of EVCs, such as a point-to-point EVC, multipoint-to-multipoint EVC, point-to-multipoint EVC, etc.

Network device 208 may include switches (e.g., Ethernet switches), routers, and/or other network devices. Some of these devices may provide support for Ethernet services (e.g., Cisco 6509 Switch). In one implementation, network device 208 may operate as a switch for forwarding Ethernet service frames in tree 102 or leaky tree 152.

Figure 3A:
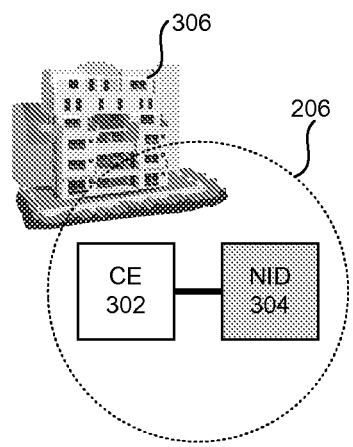
FIG. 3A is a diagram of exemplary components of a user-to-network interface (UNI) of FIG. 2.

FIG. 3A is a diagram of exemplary components of UNI 206. As shown, UNI 206 may include a customer edge (CE) device 302 and a network interface device (NID) 304. Depending on the implementation, UNI 206 may include fewer, additional, or different devices than those illustrated in FIG. 3A. For example, in one implementation, UNI 206 may include only NID 304. In another implementation, UNI 206 may include CE device 302, NID 304, and an Ethernet switch.

CE device 302 may provide an entry/exit to/from customer network, and may be located in customer premises 306 (e.g., office, apartment, house, etc.). Examples of CE device 302 include a router, modem, firewall, etc. In FIG. 3A, CE device 302 may provide the customer-side functions of UNI (UNI-C).

NID 304 may include a device that provides a service provider/carrier's functions of UNI (UNI-N). In a different implementation, NID 304 may provide for other functions that are not necessarily associated with a UNI (e.g., signal processing). Examples of NID 304 include a telephone network interface (TNI), an optical network terminal (ONT), wiring terminals, etc.

Figure 3B:
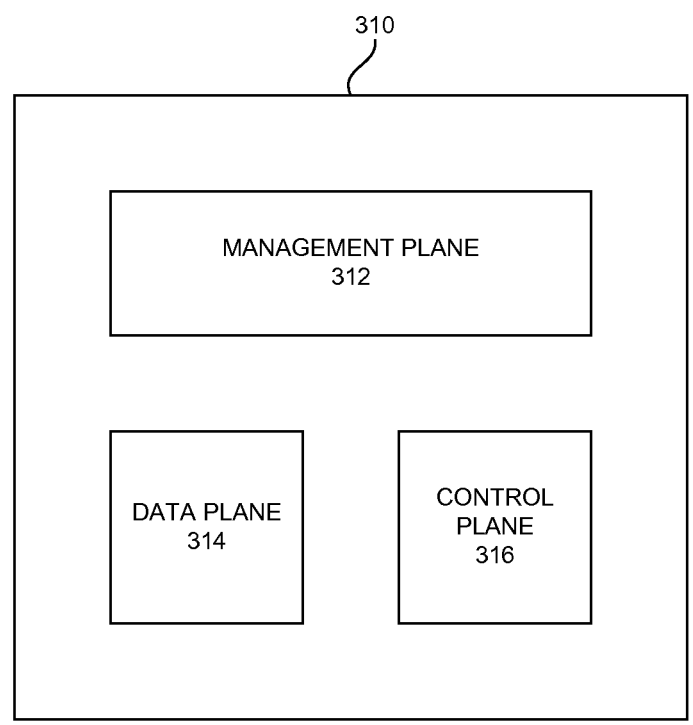
FIG. 3B is a block diagram of exemplary functional components of a network element of FIG. 2.

FIG. 3B is a block diagram of exemplary functional components of a network element of FIG. 2. Network element 310 may represent UNI 206, network device 208, a device in network 202 or 204, a device or component in UNI 206 or in network device 208. As shown in FIG. 3B, network element 310 may include a management plane component 312, data plane component 314, and control plane component 316. Depending on the implementation, network element 310 may include additional, fewer, or different components than those illustrated in FIG. 3B. For example, in some implementations, network element 310 may not include management plane component 312 or control plane component 316.

Management plane component 312 may include hardware and/or software components for supporting operation, administration, and management functions. For example, management plane component 312 may support discovery, remote failure detection/indication, remote loopback testing, alarm generation or processing, link performance monitoring, management information base (MIB) data retrieval, etc.

Data plane component 314 may include hardware/software components for processing data. In some implementations, such as routers or switches, data plane component 314 may forward data to their destinations in network 200. Examples of data plane component 314 may include an Ethernet card, line card of a router, packet processing engine on the line card, forwarding information base (FIB), switching table (e.g., Media Access Control (MAC) address table), etc.

Control plane component 316 may include hardware/software components for exchanging signaling information between a network device 310 and another network element. The information may include, for example, routing information in accordance with a specific protocol, traffic engineering information, etc.

Figure 4A:
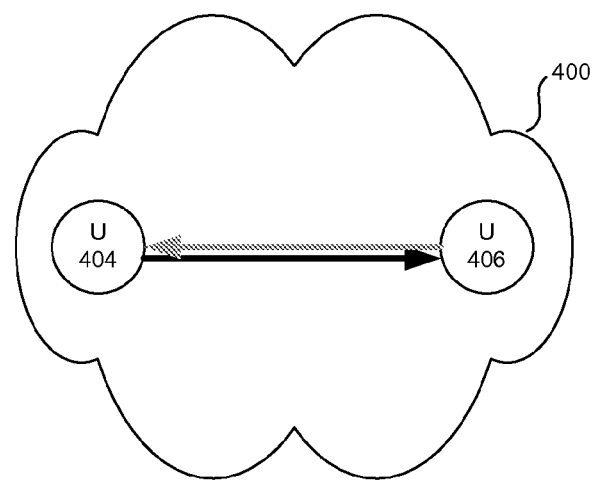
FIG. 4A is a diagram of an exemplary point-to-point Ethernet virtual circuit (EVC)

FIG. 4A is a diagram of an exemplary point-to-point EVC 400. As shown, point-to-point EVC 400 may include UNI (U) 404 and UNI (U) 406. In a point-to-point EVC (also called E-Line), one UNI may connect directly to another UNI. In some implementations, a point-to-point EVC may include an Ethernet private line (EPL), and in other implementations, may include Ethernet Virtual private line (EVPL).

EPL typically replaces a Time Division Multiplexed (TDM) line. Also, EPL is a port-based service with a single EVC that includes dedicated UNIs. In some implementations, EPL is implemented as Ethernet over Synchronous Digital Hierarchy (SDH). EVPL typically replaces Frame Relay or Asynchronous Transfer Mode (ATM) virtual private network (VPN) services. Because EVPLs are virtual, multiple EVCs of EVPLs may be delivered over a single UNI to a site.

Figure 4B:
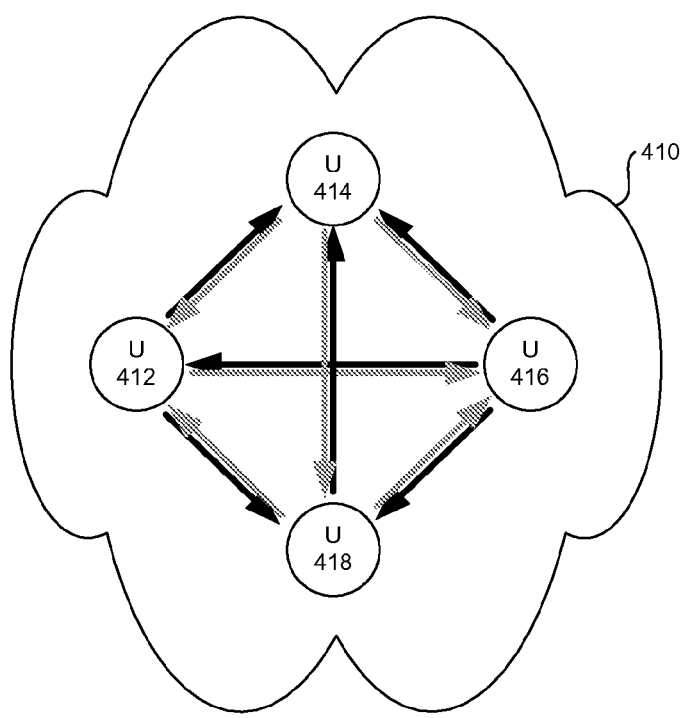
FIG. 4B is a diagram of an exemplary multipoint-to-multipoint EVC.

FIG. 4B is a diagram of an exemplary multipoint-to-multipoint EVC 410. As shown, multipoint-to-multipoint EVC 410 may include UNIs (Us) 412 through 418. In a multipoint-to-multipoint EVC (also called E-LAN), one UNI may connect to more than one other UNI. Although FIG. 4B shows multipoint-to-multipoint EVC 410 as including four fully-meshed UNIs, in an actual implementations, a multipoint-to-multipoint EVC may include additional, fewer, or different arrangement (e.g., not fully meshed) of UNIs than those illustrated in FIG. 4B. In some implementations, a multipoint-to-multipoint EVC may include Ethernet private LAN (EP-LAN) and/or Ethernet Virtual Private LAN (EVP-LAN). EP-LAN and EVP-LAN may provide for dedicated service-multiplexed UNIs and transparent LAN and VPN services.

Figure 5A:
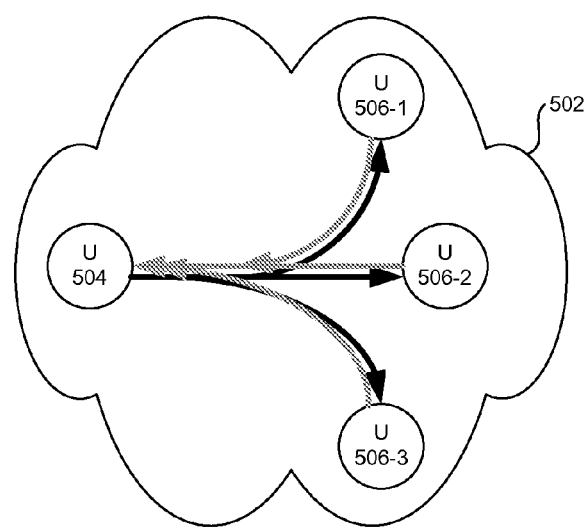
FIG. 5A is a diagram of an exemplary point-to-multipoint EVC.

FIG. 5A is a diagram of an exemplary point-to-multipoint EVC 502. Point-to-multipoint EVC 502 may provide for Ethernet Private Tree (EP-Tree) or Ethernet Virtual Private Tree (EVP-Tree) services. EP-Tree and EVP-Tree are examples of tree 102 and/or the non-leaky tree service shown in FIG. 1A.

As shown, point-to-multipoint EVC 502 may include UNI 504 and UNIs 506-1 through 506-3 (collectively UNIs 506 and individually UNI 506). As shown by different arrows, in point-to-multipoint EVC 502, network traffic may travel from/to root UNI 504 to/from leaf UNIs 506. As in FIG. 1A, the tree in FIG. 5A is not leaky. That is, traffic may not flow from one leaf UNI 506 directly to another leaf UNI 506.

Figure 5B:
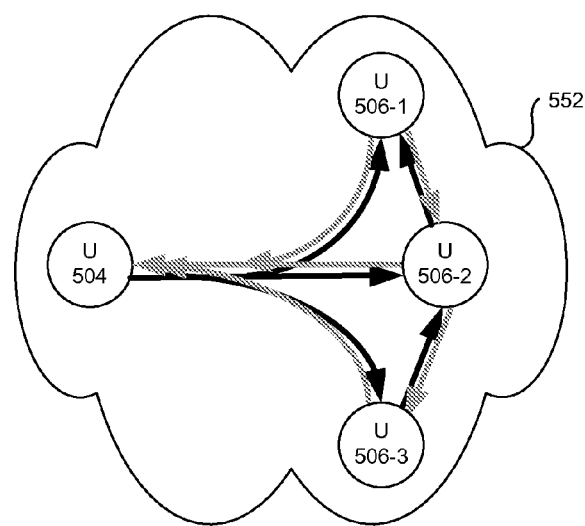
FIG. 5B is a diagram of an exemplary leaky point-to-multipoint EVC.

FIG. 5B shows a leaky point-to-multipoint EVC 552. Leaky point-to-multipoint EVC 552 is an example of leaky tree 152 and the leaky tree service of FIG. 1B. As shown in FIG. 5B, leaky point-to-multipoint EVC 552 may include the same UNIs as point-to-multipoint EVC 502. However, in contrast to leaf UNIs 506 in the point-to-multipoint EVC 502, in leaky point-to-multipoint EVC 552, leaf UNIs 506 may directly send data to other leaf UNIs 506. That is, leaky point-to-multipoint EVC 552 includes the same logical network configuration (e.g., logical network paths) as a point-to-multipoint EVC 502, except that, in leaky point-to-multipoint EVC 552, the leaves "leak" traffic to other leaves.

Leaky point-to-multipoint EVC 552 may be more efficient than point-to-multipoint EVC 502 in conveying data between leaf UNIs 506 in certain situations (e.g., root UNI 504 relays data from one leaf UNI 506 to another leaf UNI 506 without processing the data). In addition, leaky point-to-multipoint EVC 552 uses a single virtual local area network identifier for traffic flows between a root and leaf UNIs, as well as for flows between leaf UNIs. Accordingly, a subscriber (e.g., a user at a UNI) may not need to purchase, for example, additional EVCs to support leaf-to-leaf traffic.

Point-to-multipoint EVC 502 and leaky point-to-multipoint EVC 552 are exemplary. In an actual implementation, point-to-multipoint EVC 502 or leaky point-to-multipoint EVC 552 may include additional or fewer UNIs than those illustrated in FIGS. 5A and 5B. In addition, although not shown in FIGS. 5A and 5B, EVCs 502 and 504 may include other network elements, such as network switches (e.g., Ethernet switches that route Ethernet service frames from one UNI (e.g., UNI 504) to another UNI (e.g., UNI 506-1)), routers, etc.

Figure 6:
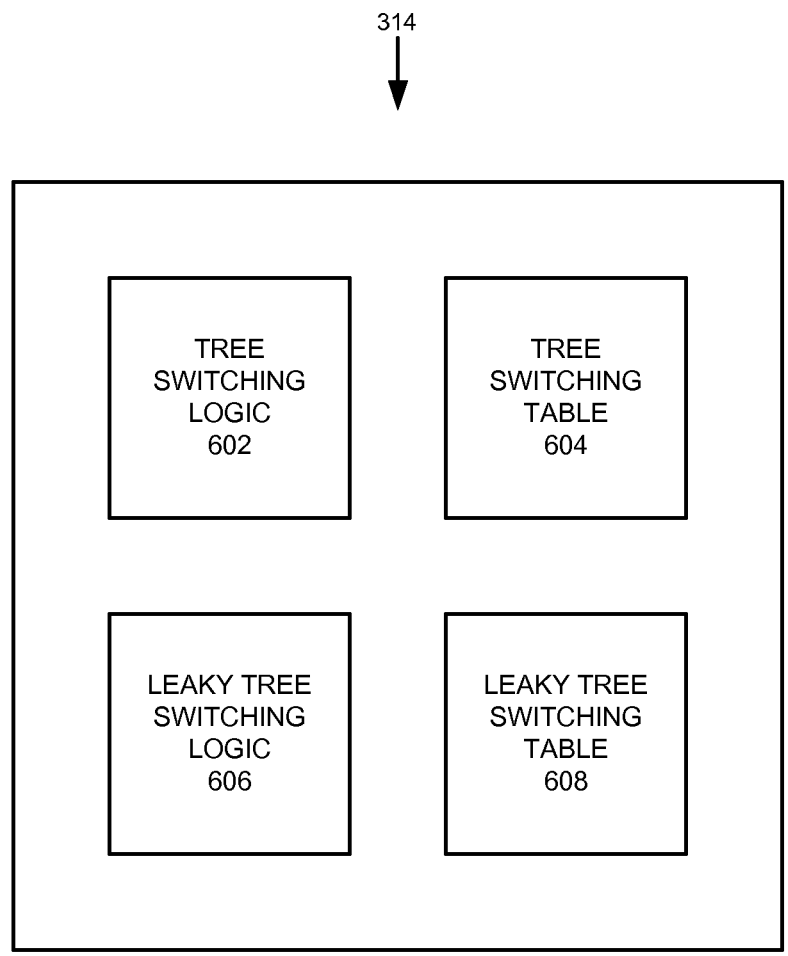
FIG. 6 is a block diagram of exemplary functional components of the data plane of the network element of FIG. 3.

FIG. 6 is a block diagram of exemplary functional components of data plane component 314 of network element 302. As shown, data plane component 314 may include tree switching logic 602, a tree switching table 604, leaky tree switching logic 606, and a leaky tree switching table 608. Although data plane component 314 may include additional components, such as a processor, network interface, etc., for simplicity, they are not illustrated in FIG. 6. In addition, depending on the implementation, two or more functional blocks in FIG. 6 may be combined into one, and/or a single functional block in FIG. 6 may be implemented as multiple blocks or components. For example, tree switching logic 602 and leaky tree switching logic 606 may be implemented as a one module or block.

Figure 7A:
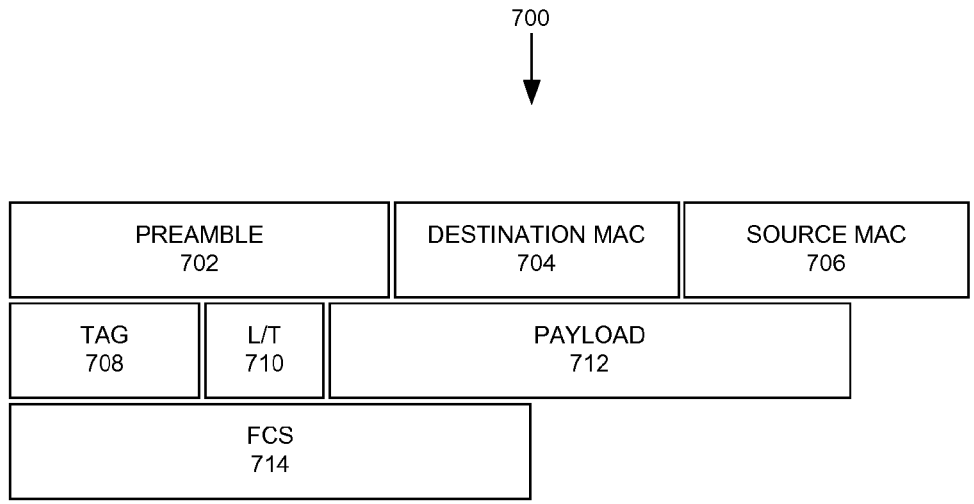
FIG. 7A is a block diagram of an exemplary tagged Ethernet service frame.

Tree switching logic 602 may forward an Ethernet service frame from a source MAC address toward a destination MAC address in a point-to-multipoint EVC. FIG. 7A is a block diagram of an exemplary Ethernet service frame 700. As shown, Ethernet service frame 700 may include a preamble field 702, destination MAC address field 704, source MAC address field 706, tag field 708, L/T field 710, payload field 712, and FCS field 714.

Depending on the implementation, Ethernet service frame 700 may support a particular format (e.g., Institute of Electrical and Electronic Engineers (IEEE) 802.3-2005, IEEE 802-2006, Ethernet Version 2, IEEE 802.2, etc.), and thus, may include additional, fewer, or different fields than those illustrated in FIG. 7A. For example, an Ethernet 802.2 Logical Link Control (LLC) frame type may include a length field, destination service access point (DSAP) field, source service access point (SSAP) field, etc. In another example, when Ethernet service frame 700 does not provide for a virtual LAN (VLAN) service, Ethernet service frame 700 may not include tag field 708. Ethernet service frames in a leaky tree (e.g., leaky point-to-multipoint EVC 552) typically provide for VLAN, and therefore, include tag field 708. In yet another example, Ethernet service frame 700 may include additional VLAN tags.

Preamble field 702 may include a synchronization bit pattern. The bit pattern may also include a frame delimiter. Destination MAC address field 704 may include the identifier for a destination network interface, in a network, to which Ethernet service frame 700 is sent. The destination address may be a broadcast, unicast, or multicast address.

Source MAC address field 706 may include an identifier of the source network interface, in a network, from which the Ethernet service frame has been transmitted. The source address may be a unicast address.

Tag field 708 may include an IEEE 802.1Q tag, also called a VLAN tag. A VLAN tag describes the VLAN to which Ethernet service frame 700 belongs. The VLAN tag is described below with reference to FIG. 7B.

L/T field 710 may include an Ethernet type field. L/T field 710 may identify the specific communication protocol using frame 700. Payload field 712 may include data. FCS field 714 may include frame check sequence (FCS), such as cyclic redundancy check (CRC) bits.

Figure 7B:
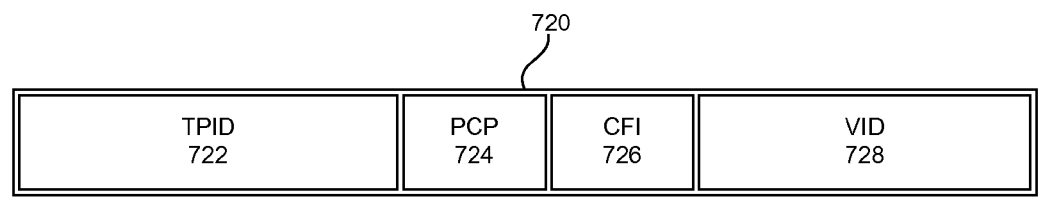
FIG. 7B is a block diagram of an exemplary virtual Local Area Network (VLAN) tag.

FIG. 7B is a block diagram of an exemplary VLAN tag 720. As shown, VLAN tag 720 may include a Tag Protocol Identifier (TPID) field 722, priority code point (PCP) field 724, canonical format indicator (CFI) field 726, and VLAN identifier field 728. TPID field 722 may include a particular sequence of bits to indicate that frame 700 includes a VLAN tag 720.

PCP field 724 may indicate a priority level of frame 700 that includes VLAN tag 720. Values in PCP field 724 may indicate different CoS. As described below, leaky tree switching logic 806 may use a value at PCP field 724 of a received Ethernet service frame to switch the frame.

CFI field 726 may indicate whether MAC addresses in the Ethernet service frame are in a canonical format. CFI field 726 may be used for compatibility between Ethernet and Token Ring networks. VLAN identifier field 728 may specify the VLAN to which the Ethernet service frame belongs.

Returning to FIG. 6, tree switching logic 602 may use source and destination MAC address fields 704 and 706 of a received Ethernet service frame 700 and tree switching table 604 to switch or forward the received Ethernet service frame 700 in a point-to-multipoint EVC. In forwarding Ethernet service frame 700, tree switching logic 602 may search a source MAC address and destination MAC address combination in tree switching table 604 to identify the output port on which the received frame 700 may be sent.

Figure 8:
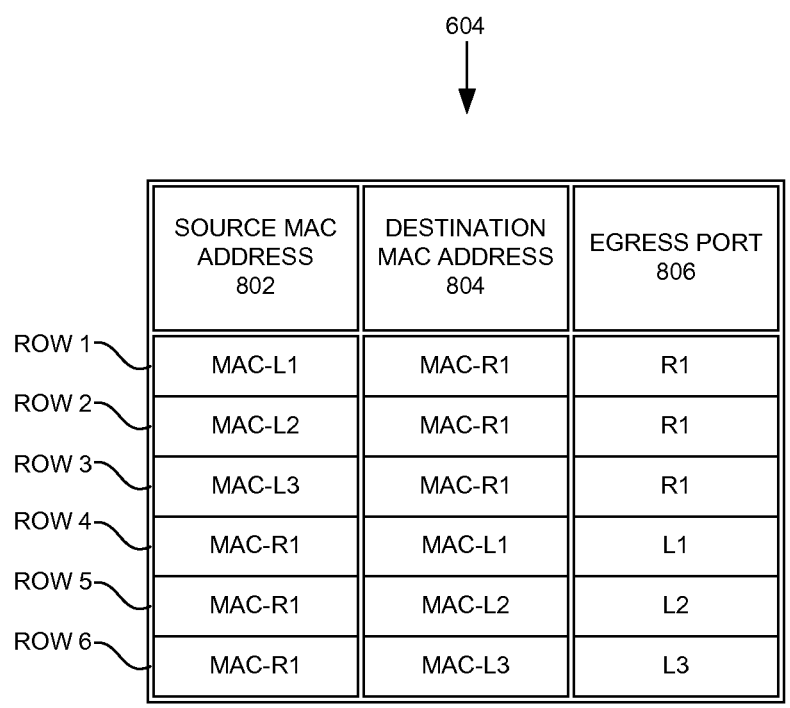
FIG. 8 illustrates an exemplary implementation of the tree switching table of FIG. 6.

Tree switching table 604 may include information that tree switching logic 602 may use to switch/forward a received Ethernet service frame in a point-to-multipoint EVC. FIG. 8 illustrates an exemplary implementation of tree switching table 604. As shown in FIG. 8, tree switching table 602 may include a source MAC address column 802, destination MAC address column 804, and egress port identifier column 806. Source and destination MAC address columns 802 and 804 may include source and destination MAC addresses, respectively. Egress port identifier column 806 may include port identifiers. Each port identifier in egress port identifier column 806 may correspond to the port through which a received Ethernet service frame may be transmitted, in order for the frame to reach the destination MAC address from the source MAC address in the network.

For example, assume that network device 208-1 receives an Ethernet service frame with the source MAC address for UNI 504 and the destination MAC address for UNI 506-2. Thereafter, tree switching logic 602 in data plane 314 of the network device 208-1 may look up the source and destination MAC addresses in tree switching table 604. As shown in FIG. 8, both the source MAC address (i.e., the MAC address of UNI 504) and destination MAC address (i.e., the MAC address of UNI 506-2) are found in row 5. The egress port identifier in row 5 is L2. Accordingly, tree switching logic 602 may forward the Ethernet service frame via the port identified by L2.

Figure 9:
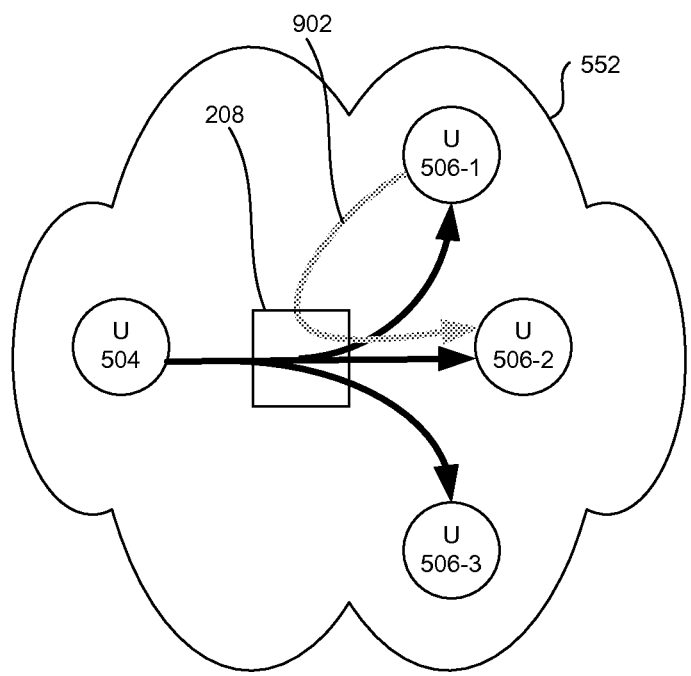
FIG. 9 is a diagram illustrating exemplary leaky tree switching by the exemplary leaky tree switching logic of FIG. 6.

Referring back to FIG. 6, leaky tree switching logic 606 may forward an Ethernet service frame 700 from a source to destination MAC address in a leaky point-to-multipoint EVC. FIG. 9 is a diagram illustrating exemplary leaky tree switching by leaky tree switching logic 606. As shown in FIG. 9 by gray arrow 902, an Ethernet service frame may "leak" from a UNI 506-1 to UNI 506-2 via network device 208, bypassing root UNI 504. Although not illustrated, UNI 506-2 and 506-3 may also leak Ethernet service frames to other leaf UNIs 506.

Returning to FIG. 6, leaky tree switching logic 606 may use source and destination MAC address fields 704 and 706 of a received Ethernet service frame 700 and leaky tree switching table 608 to switch or forward the received Ethernet service frame 700 in a leaky point-to-multipoint EVC. In forwarding Ethernet service frame 700, leaky tree switching logic 606 may search a source MAC address, destination MAC address, and PCP field value (see FIG. 7B) combination in leaky tree switching table 608, to identify the output port via which the received frame 700 may be sent.

Leaky tree switching table 608 may include information that leaky tree switching logic 606 may use to switch or forward a received Ethernet service frame in a leaky point-to-multipoint EVC. FIG. 10 illustrates an exemplary implementation of leaky tree switching table 608. As shown in FIG. 10, leaky tree switching table 608 may include a source MAC address column 1002, destination MAC address column 1004, PCP bits column 1006, and egress port identifier column 1008. Source and destination MAC address columns 1002 and 1004 may include source and destination MAC addresses, respectively.

PCP bits column 1006 may include possible values to which PCP bits field 724 in VLAN tag 720 in tag field 708 of Ethernet service frame may be matched. In one implementation, each PCP bits value in PCP bits column 1006 may include one of three possible values: ANY, T, and ~T. Thus, ANY, T, or ~T may be matched against a PCP bits field value that is read or scanned from a received Ethernet service frame, in order to locate the port on which the Ethernet service frame is to be transmitted or to determine whether the Ethernet service frame is to be handled in another way (e.g., dropped).

The PCP bits value ANY matches any PCP bits field value of the Ethernet service frame. For example, in row 1 of table 608, the PCP bits value is ANY. Accordingly, the forwarding information for an Ethernet service frame with the same source MAC address, destination MAC address, and any PCP bits field value is found in row 1. Egress port column 1008 of row 1 indicates that the Ethernet service frame is to be sent via port R1.

The PCP bits value T matches the PCP bits field value of T. For example, in row 2 of table 608, the PCP bits value is T. Accordingly, the forwarding information for an Ethernet service frame having the same source MAC address, destination MAC address, and the PCP bits field value is found in row 2. The Ethernet service frame may be sent to destination MAC address of MAC-L2 through egress port L2, as indicated in row 2.

The PCP bits value ~T matches the PCP bits field value of ~T. For example, in row 6 of table 608, the PCP bits value is ~T. Accordingly, the forwarding information for an Ethernet service frame having the same source MAC address, destination MAC address, and the PCP bits field value of ~T is found in row 6. According to row 6, the Ethernet service frame may be dropped by network device 208.

Egress port identifier column 1006 may include identifiers for ports. Each port identifier in egress port identifier column 1006 may correspond to the port through which a received Ethernet service frame may be transmitted, in order for the frame to reach the destination MAC address from the source MAC address, given a specific value of PCP field 724 in VLAN tag 720 of the Ethernet service frame.

For example, assume that network device 208 in FIG. 9 receives an Ethernet service frame with the source MAC address for UNI 506-1, the destination MAC address for UNI 506-2, and the PCP bits field value of T. Thereafter, tree switching logic 602 in data plane 314 of the network device 208-1 may look up the source MAC address, destination MAC address, and the PCP bits field value of the Ethernet service fame in leaky tree switching table 608. As shown in FIG. 10, both the source MAC address (i.e., the MAC address of leaf UNI 506-1), destination MAC address (i.e., the MAC address of leaf UNI 506-2), and the PCP bits value T are found in row 5. In accordance with row 5, leaky tree switching logic 606 may forward the Ethernet service frame via the port identified by L2.

Figure 11:
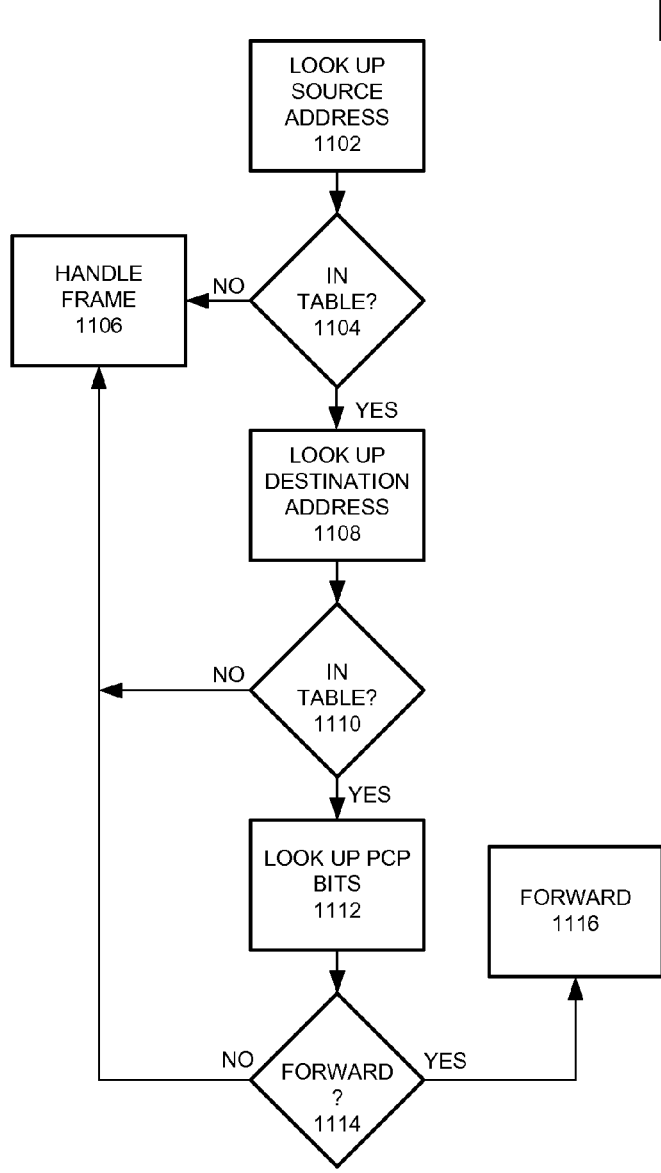
FIG. 11 is a flow diagram of an exemplary process associated with the leaky tree switching logic of FIG. 6.

FIG. 11 is a flow diagram of an exemplary process 1100 that is associated with leaky tree switching logic 606. Assume that a network device 208 has received an Ethernet service frame over a leaky point-to-multipoint EVC. Process 1100 may begin with network device 208 looking up the source MAC address of the received Ethernet service frame in leaky tree switching table 608 (block 1102).

Network device 208 may determine whether the source MAC address is in leaky tree switching table 608 (block 1104). If the source MAC address is not in leaky tree switching table 608 (block 1104: no), network device 208 may proceed to block 1106, to handle the Ethernet service frame (block 1106). Handling the Ethernet service frame may include recording flow data (e.g., recording the source MAC address, destination MAC address, etc.), examining contents of the frame, dropping the frame, etc.

If the source MAC address is in leaky tree switching table 608 (block 1104: yes), network device 208 may look up the destination MAC address of the Ethernet service frame in leaky tree switching table 608 (block 1108). If the destination MAC address is not found in leaky tree switching table 608 (block 1110: no), network device 208 may proceed to block 1106, to handle the Ethernet service frame.

Otherwise (block 1110: yes), network device 208 may look up the PCP bits value of VLAN tag 720 of the Ethernet service frame in leaky tree switching table 608 (block 1112). In other implementations, network device 208 may look up the PCP bits value of the frame in leaky tree switching table 608 only if neither the destination MAC address nor the source MAC address is a root—otherwise, network device 208 may forward the frame in the same manner the frame would be forwarded in a non-leaky tree. In any case, based on the forwarding information found in leaky tree switching table 608, by looking up the source MAC address, destination MAC address, and PCP bit values, network device 208 may determine whether to forward the Ethernet service frame (block 1114).

If network device 208 is to forward the frame (block 1114: yes), network device 208 may proceed to block 1116, and forward the Ethernet service frame via a port identified in the same row, of leaky tree switching table 608, at which the source MAC address, destination MAC address, and PCP bits value are found (block 1116). Otherwise (block 1114: no), network device 208 may proceed to block 1106, to handle the Ethernet service frame.

In some implementations, an Ethernet service frame received at network device 208 may include more than one VLAN tag (i.e., frame belongs to more than VLAN. In such a case, for each of the VLANs, network device 208 may select a particular VLAN tag (in Ethernet service frame 700) corresponding to the VLAN and perform process 1100 the VLAN.

Figure 12:
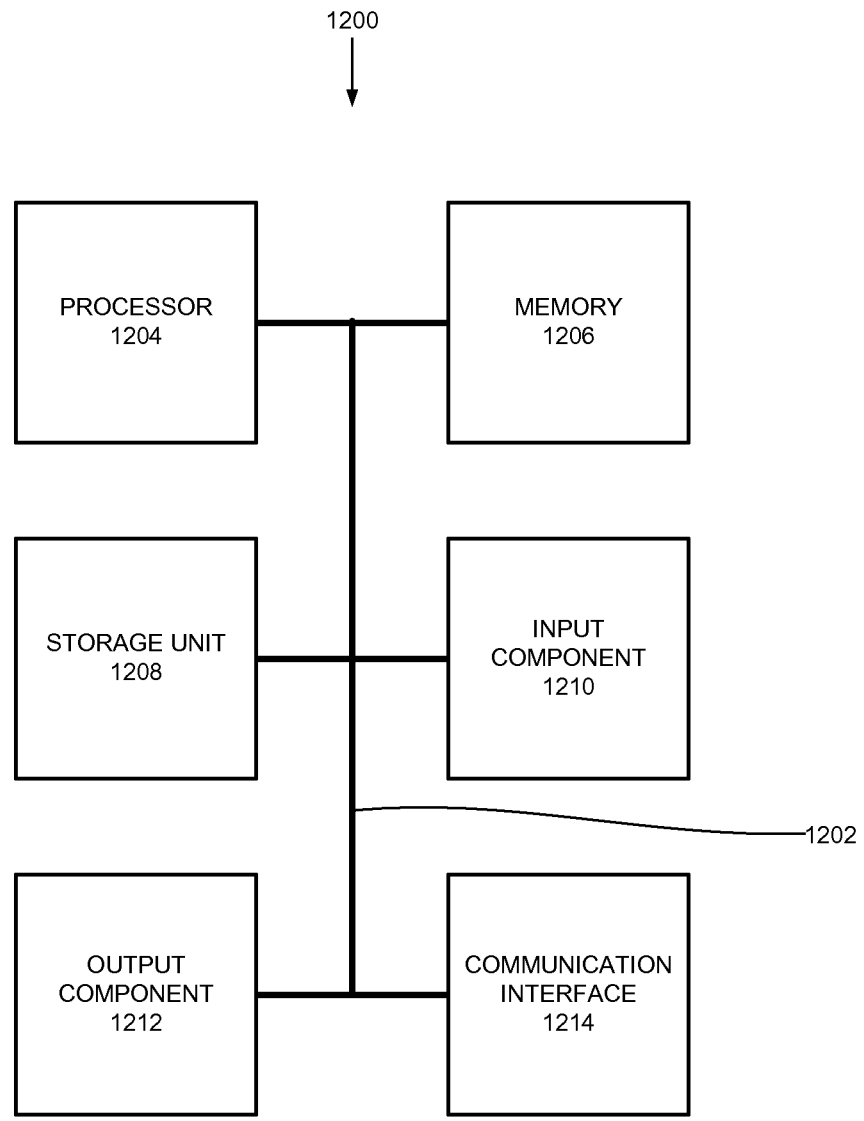
FIG. 12 is a block diagram of exemplary components of a network device of FIG. 2.

FIG. 12 is a block diagram of an exemplary network device 1200. Network device 1200 may correspond to one or more of devices on which network elements in FIG. 2 may be implemented (e.g., customer edge device 302, network interface device 304, etc.) or devices in network 200 (e.g., network device 208). Referring to FIG. 12, network device 1200 may include bus 1202, processor 1204, memory 1206, storage unit 1208, input component 1210, output component 1212, and communication interface 1214. Bus 1202 may include a path that permits communication among the elements of network device 1200.

Processor 1204 may include a processor, a microprocessor, an Application Specific Integrated Circuit (ASIC), a Field Programmable Gate Array (FPGA), and/or other processing logic (e.g., embedded devices) capable of controlling network device 1200, processing data (e.g., incoming frames, etc.). Memory 1206 may include static memory, such as read only memory (ROM), and/or dynamic memory, such as random access memory (RAM) and content addressable memory (CAM), or onboard cache, for storing data and machine-readable instructions (e.g., programs, scripts, etc.).

Storage unit 1208 may include a floppy disk, CD ROM, CD read/write (R/W) disc, and/or flash memory, as well as other types of storage devices (e.g., hard disk drive) for storing data and/or machine-readable instructions (e.g., a program, script, etc.). Depending on the context, the term "memory," "storage," "storage device," and/or "storage unit" may be used interchangeably. For example, a "computer-readable storage device" or "computer readable medium" may refer to a memory and/or storage device.

Input component 1210 may permit a user to input information to network device 1200. Input component 1210 may include, for example, a keyboard, a keypad, a mouse, a pen, a microphone, a touch screen, voice recognition and/or biometric mechanisms, etc. Output component 1212 may include a mechanism that outputs information to the user. Output component 1212 may include, for example, a display, a printer, a speaker, etc. In some implementations, because network device 1200 may operate as a server device, network device 1200 may include a minimal number of input components 1210 and output components 1212 (e.g., a keyboard and/or a console), to minimize cost and to increase robustness.

Communication interface 1214 may include a transceiver (e.g., a transmitter or receiver) for network device 1200 to communicate with other devices and/or systems. For example, via communication interface 1214, network device 1200 may communicate over a network, such as the Internet, an intranet, a terrestrial wireless network (e.g., a WLAN, WiFi, WiMax, etc.), a satellite-based network, optical network, etc. Communication interface 1214 may also include a modem, an Ethernet interface to a LAN, and/or another interface.

In the description above, in a leaky tree, data may be forwarded directly from a leaf to another leaf. This is in contrast to non-leaky trees. For example, in a point-to-multipoint EVC, traffic may travel from a root to leaves and from the leaves to the root. However, the traffic may not flow from a leaf directly to another leaf. In a leaky tree, network device 208 may forward or switch an Ethernet service frame, based on PCP bits in a VLAN tag of the Ethernet service frame and a leaky tree switching table, from a leaf to another leaf without traveling through a root.

A leaky tree may be more efficient than a non-leaky tree in conveying data between leaves in certain situations (e.g., in situations where a root only relays data from one leaf to another leaf without processing the data). In addition, as described above, a leaky tree uses a single VLAN identifier for traffic flows between a root and leaves, as well as for flows between the leaves. Accordingly, a subscriber (e.g., a user at a network element (e.g., a leaf or root)) may not need to purchase, for example, additional EVCs to support leaf-to-leaf traffic.

In this specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while a series of blocks have been described with regard to the process illustrated in FIG. 11, the order of the blocks may be modified in other implementations. In addition, non-dependent blocks may represent blocks that can be performed in parallel.

It will be apparent that aspects described herein may be implemented in many different forms of software, firmware, and hardware in the implementations illustrated in the figures. The actual software code or specialized control hardware used to implement aspects does not limit the invention. Thus, the operation and behavior of the aspects were described without reference to the specific software code—it being understood that software and control hardware can be designed to implement the aspects based on the description herein.

No element, block, or instruction used in the present application should be construed as critical or essential to the implementations described herein unless explicitly described as such. Also, as used herein, the article "a" is intended to include one or more items. Further, the phrase "based on" is intended to mean "based, at least in part, on" unless explicitly stated otherwise.

What is claimed is:

1. A method comprising:
receiving, by a network device, a first Ethernet frame from a first leaf user-to-network (UNI) interface in a tree, wherein the tree includes the first leaf UNI, a second leaf UNI, and a root UNI, wherein the first Ethernet frame includes a virtual local area network (VLAN) tag, and wherein the VLAN tag includes VLAN fields that exclude a VLAN identifier (ID) field;
when the VLAN fields include a first value,
selecting a first network path that is included in the tree, and
sending the first Ethernet frame over the first network path, from the network device through the root UNI to the second leaf UNI;
when the VLAN fields include a second value,
selecting a second network path that is not included the tree, and
sending the first Ethernet frame over the second network path, from the network device to the second leaf UNI without passing through the root UNI; and
when the VLAN fields do not include the first value and the second value,
dropping the first Ethernet frame.

2. The method of claim 1, wherein the receiving includes:
receiving, by an Ethernet switch, the first Ethernet frame.
3. The method of claim 1, wherein the receiving includes:
receiving, by the network device participating in an Ethernet Virtual Circuit (EVC), the first Ethernet frame from the first leaf UNI.
4. The method of claim 1, comprising:
determining whether to drop the first Ethernet frame.
5. The method of claim 1, wherein selecting the first network path includes:
matching a field value in the VLAN fields to one of the first value and the second value in a table.
6. The method of claim 5, wherein the matching includes:
looking up, in the table, a priority code point (PCP) bits field value of the VLAN tag in the first Ethernet frame.
7. The method of claim 5, wherein matching includes:
selecting the VLAN tag from one or more VLAN tags in the Ethernet frame.
8. The method of claim 1, wherein the receiving includes:
receiving, by the network device in the tree, the first Ethernet frame from a network interface device (NID).
9. The method of claim 1, further comprising:
receiving a second Ethernet frame from the first leaf UNI; and
sending the second Ethernet frame to the root UNI of the tree over the first network path.
10. The method of claim 1, wherein the receiving includes:
receiving, by the network device in the tree, the first Ethernet frame from a customer edge device.
11. A network device comprising:
a data plane component to:
receive, via a channel, an Ethernet frame from a first leaf user-to-network interface (UNI) of a tree service in which the network device participates, the tree service comprising the first leaf UNI, a second leaf UNI, and a root UNI, wherein the Ethernet frame includes a virtual local area network (VLAN) tag;
when the VLAN tag includes a first value,
select a first network path included in the tree service, and
send the Ethernet frame over the first network path, from the network device through the root UNI to the second leaf UNI;
when the VLAN tag includes a second value,
select a second network path that is not included the tree service, and
send the Ethernet frame over the second network path, from the network device to the second leaf UNI without passing through the root UNI; and
when the VLAN tag does not include the first value and the second value,
drop the Ethernet frame.
12. The network device of claim 11, wherein the data plane component includes:
an Ethernet card.
13. The network device of claim 11, wherein the channel includes:
an Ethernet Virtual circuit (EVC).
14. The network device of claim 11, wherein the data plane component is further configured to:
look up, in a table, a source media access control (MAC) address of the Ethernet frame to identify an output port through which the Ethernet frame is sent to the second leaf UNI.
15. The network device of claim 14, wherein when the data plane component identifies the output port, the data plane component is further configured to:
select the VLAN tag among one or more VLAN tags in the Ethernet frame.
16. The network device of claim 15, wherein the data plane component is further configured to:
scan a priority code point (PCP) field value in the selected VLAN tag.
17. The network device of claim 11, wherein the Ethernet frame includes:
an Institute of Electrical and Electronic Engineers (IEEE) 802.3-2005 Ethernet frame.
18. The network device of claim 11, wherein the first leaf UNI includes at least one of:
a customer edge device or a network interface device.
19. A virtual circuit, comprising:
a root user-to-network interface (UNI);
a first leaf UNI configured to send an Ethernet service frame;
a second leaf UNI;
a network element, which participates in a tree service, configured to:
receive the Ethernet service frame from the first leaf UNI, wherein the tree service comprises the first leaf UNI, the second leaf UNI, and the root UNI, and wherein the Ethernet service frame includes a virtual local area network (VLAN) tag;
when the VLAN tag includes a first value,
select a first network path included in the tree service, and
send the Ethernet service frame over the first network path, from the network element through the root UNI to the second leaf UNI;
when the VLAN tag includes a second value,
select a second network path that is not included the tree service, and
send the Ethernet service frame over the second network path, from the network element to the second leaf UNI without passing through the root UNI; and
when the VLAN tag does not include the first value and the second value, drop the Ethernet service frame.
20. The virtual circuit of claim 19, wherein the first leaf UNI includes at least one of:
a customer edge device or a network interface device.

* * * * *